A. C. LINDGREN.
HARROW.
APPLICATION FILED MAR. 29, 1909.
965,390.
Patented July 26, 1910.
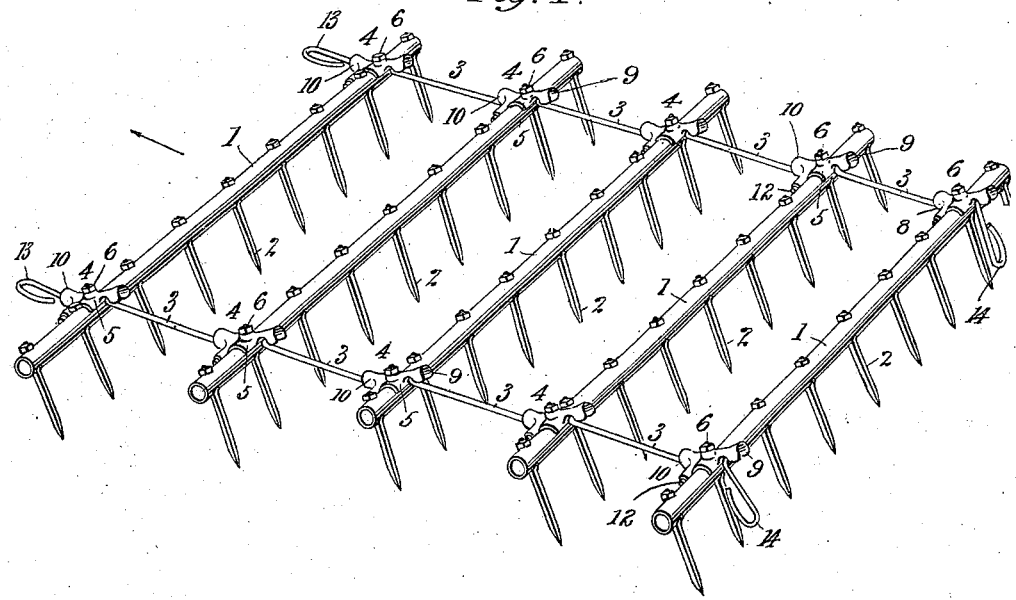
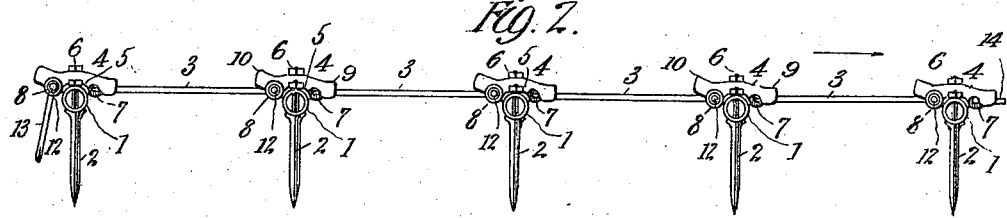
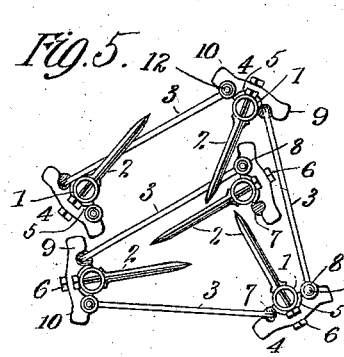
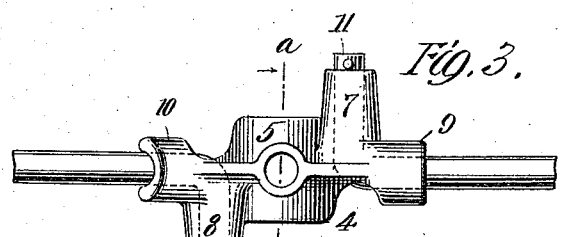
Witnesses:
Inventor
A. C. Lindgren
By his Attorney
P. T. Dodge

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

HARROW.

965,390. Specification of Letters Patent. Patented July 26, 1910.

Application filed March 29, 1909. Serial No. 486,377.

*To all whom it may concern:*

Be it known that I, ALEXUS C. LINDGREN, of Moline, county of Rock Island, and State of Illinois, have invented a new and useful Improvement in Harrows, of which the following is a specification.

This invention relates to harrows of the type in which the harrow bars are flexibly connected together in such manner as to adapt the bars to rock relatively to each other, mainly for the purpose of enabling the teeth to readily override obstructions and of conforming to irregularities in the surface of the ground.

The objects of the invention are: First, to produce a harrow of this type which, while permitting the harrow bars to rock relatively on transverse axes, will maintain rigid and stiff relations in a transverse or lateral direction to the end that the teeth will be prevented from "lining up," and will perform their functions with the greatest degree of effectiveness. Second, to adapt the teeth, when the harrow is drawn in one direction, to stand in an upright position, so as to act to break and stir the soil; and when drawn in the opposite direction to stand at an inclination or slant, so as to act with a dragging or smoothing effect on the soil. Third, to adapt the harrow as a whole to be folded up or collapsed in a compact form for transportation.

With these objects in view, my invention consists primarily in connecting the individual harrow bars by longitudinally extending links pivotally mounted at their ends in transversely extending bearings on the harrow bars and adapted to extend adjacent their ends in longitudinal seats or sockets on the harrow bars.

The invention consists also in so disposing the longitudinal sockets for the connecting links that the sockets will extend at different angles with reference to the harrow teeth, so that when the links are seated in one series of the longitudinal sockets the harrow bars will be held with the teeth in upright position, and when the links are seated in the other series of longitudinal sockets the harrow bars will be held with the teeth extending in a slanting or inclined position.

The invention consists also in the details of construction and combination of parts hereinafter described and claimed.

In the accompanying drawings: Figure 1 is a perspective view of a harrow embodying my invention, showing the same as being drawn in the direction of the arrow, with the harrow teeth standing at a slant or inclination; Fig. 2 is a side elevation of my improved harrow, showing the same as being drawn in the opposite direction and with the teeth in upright positions; Fig. 3 is a top plan view of one of the members in which the link bearings and sockets are formed, said member being shown as removed from the harrow bar; Fig. 4 is a transverse sectional elevation of the same on the line *a, a,* of the preceding figure; and Fig. 5 is a side elevation, showing the harrow folded or collapsed for transportation.

Referring to the drawings: My improved harrow comprises a series of transversely extending harrow bars 1, five in the present instance, which bars are provided each with a number of harrow teeth 2 rigidly fastened thereto by any appropriate means, a number of longitudinal connecting links 3, extending between adjacent harrow bars near the ends thereof, and a number of bearing members 4 applied to the harrow bars near each end of the same, with which bearing members the said links are pivotally connected in such manner that the bars may rock relatively to each other to a limited extent on horizontal transverse axes. The bearing members are each in the form of a casting or frame formed with a central body portion 5, adapted to be seated on and secured firmly to the harrow bar by a fastening bolt 6, with laterally extending hubs or bearings 7 and 8 on opposite sides of the body portion, and extending in opposite directions from each other, and with longitudinally extending seats or sockets 9 and 10, forming continuations of the bearing hubs and extending in opposite directions therefrom. At their ends the links 3 are bent laterally in opposite directions forming a stud or journal 11 at one end, and a similar stud or journal 12 at the other end, the studs 11 of the several links being mounted loosely in the hubs 7 of the several bearing members and secured therein by cotter keys, while the studs 12 of the several links are mounted loosely in the hubs 8 of the several bearing members and similarly secured therein, with the portions of said links adjacent their ends adapted to seat in and be embraced on opposite sides by the longitudinally extending sockets 9 and 10 respectively. As a result of this arrangement the several harrow bars are connected together at opposite ends by the longitudinally extending links, which latter have a pivotal connection at their ends with the two adjacent bars respectively, so that the said bars are capable each of a rocking motion relatively to the other on a transverse axis. This rocking motion is limited, however, by means of the longitudinally extending sockets on the bearing members, which sockets, as the harrow bars rock on the links, will contact with the links and in connection therewith will act as stops and hold the harrow bars in predetermined defined positions. This action is illustrated in Fig. 1, where it will be seen that the draft is adapted to be applied in the direction of the arrow through the medium of draft links 13, mounted in the hubs 8 of the end bearing members, with the result that the harrow bars will be tipped forward until the sockets 10 of the bearing members rest on the links, their contact with the links preventing the further pivotal movement of the harrow bars, and causing them to be maintained in position. The form and relative position of the parts are such that when in the position shown in Fig. 1, with the longitudinal sockets 10 contacting with the links, the harrow teeth will stand at a slant or inclination, and will be drawn over the ground with a smoothing or raking action on the soil. In Fig. 2, however, the draft is shown as being applied to the harrow in the opposite direction through the medium of draft links 14, having their ends bent laterally and pivotally mounted in the hubs 7 of the bearing members on this end of the harrow, in a manner similar to the connection of the draft links 13 with the opposite end of the harrow as described, and when the draft is applied through the links 14, the harrow bars will be caused to tip in the opposite direction, with the result that the sockets 9 of the bearing members will be brought into action, and contacting with the links they will limit the further pivotal movement of the bars, the relation of the said sockets 9 to the harrow teeth and links being such that when in contact with the links as described, the bars will be so held that the teeth will stand in an upright position, as shown in Fig. 2, in which position the teeth will more readily enter the soil and will act with a breaking and stirring effect thereon.

Inasmuch as the connecting links will normally, and when the draft is applied at either end of the harrow, extend in horizontal positions, the inclination of the harrow teeth with reference to the surface of the soil will be determined by the relation which the extension sockets 9 and 10 bear to the harrow bars, a greater inclination of the sockets upward from the horizontal, such as is possessed by the sockets 10, permitting the bars to tip to such extent as to hold the teeth at an inclination, as shown in Fig. 1, while the horizontal position, such as is possessed by the other sockets 9 will allow the bars to tip to an extent sufficiently only to hold the teeth in an upright position, as shown in Fig. 2. It is seen, therefore, that the sockets 9 and 10 occupy different angular relations to the harrow teeth, whereby when one or the other socket is in action the teeth will be caused to occupy different angular positions with reference to the surface of the soil.

By forming the longitudinal sockets 9 and 10 so that they will receive the links respectively when the harrow is drawn in different directions, the harrow bars are given effective support by the links in a lateral direction, and the entire structure will be tied together in such manner as to prevent any relative lateral movements of the bars. As a result of this construction and action, the harrow teeth, which are usually set in staggered relations, will be caused to travel in defined paths and will be effectually prevented from "lining up" behind each other, as their tendency would be if the bars were permitted to shift laterally with relation to each other.

While I have illustrated and described a specific embodiment of my invention which I prefer to adopt, and which in practice has been found to answer to an admirable degree the results to be obtained, it is manifest that these details are susceptible of various changes and modifications such as would suggest themselves to the skilled mechanic, and this without departing from the limits of my invention, and I desire to be understood that my invention is not limited to any specific form or arrangement of parts, except in so far as such limitations are specified in the claims.

The specific manner of connecting the longitudinal links with the harrow bars, not only enables said bars to tip to limited extent and to different inclinations when the harrow is drawn in opposite directions as described, but permits the harrow to be collapsed or folded to compact form as shown in Fig. 5, thereby facilitating its transportation from field to field, and its storage when not in use.

Having thus described my invention, its construction and mode of operation, what I claim and desire to secure by Letters Patent of the United States is as follows:

1. A flexible harrow comprising a series of toothed harrow bars each provided with oppositely extending transverse bearings and with oppositely extending longitudinal sockets, and a series of connecting links extending longitudinally between adjacent bars and mounted at their ends respectively in the transverse bearings, and adapted to extend adjacent their ends respectively in the longitudinal sockets.

2. In a harrow, the combination with a series of toothed harrow bars of bearing members applied to the bars and formed each with oppositely extending transverse elongated bearings and with oppositely extending longitudinal sockets, and a series of longitudinally extending connecting links mounted at their ends respectively in the transverse bearings, and adapted to extend respectively in the longitudinal sockets.

3. In a harrow, the combination with a series of toothed harrow bars of bearing members applied thereto, and formed each with transversely extending hubs, and with longitudinally extending sockets, a series of longitudinal connecting links extending between adjacent harrow bars and having their ends bent laterally and mounted loosely in the said hubs and adapted adjacent to their ends to extend in and be embraced by the longitudinal sockets.

4. A bearing member for a flexible harrow, said bearing member comprising a frame adapted to be fixed to the harrow bar and formed with a transverse bearing opening in which the end of the connecting link is adapted to be pivotally mounted, and formed also with a longitudinal socket adapted to receive and embrace the body of the link adjacent its end.

5. An improved bearing member for a flexible harrow, said bearing member comprising a frame adapted to be applied to the harrow bar, and formed with oppositely extending bearing hubs adapted to have the ends of adjacent links pivotally mounted therein, and provided also with oppositely extending longitudinal sockets arranged in line and adapted to receive and embrace the body portions of the links adjacent their ends.

In testimony whereof I hereunto set my hand this 8th day of March, 1909, in the presence of two attesting witnesses.

ALEXUS C. LINDGREN.

Witnesses:
C. R. STEPHENS,
R. A. DOUGLASS.